(12) United States Patent
Roper

(10) Patent No.: US 9,027,426 B2
(45) Date of Patent: May 12, 2015

(54) SYNCHRONIZATION DEVICE

(71) Applicant: Ford Global Technologies, LLC, Dearborn, MI (US)

(72) Inventor: Hartmut Roper, Monheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/345,367

(22) PCT Filed: Sep. 26, 2012

(86) PCT No.: PCT/EP2012/068952
§ 371 (c)(1),
(2) Date: Mar. 17, 2014

(87) PCT Pub. No.: WO2013/053599
PCT Pub. Date: Apr. 18, 2013

(65) Prior Publication Data
US 2014/0345403 A1    Nov. 27, 2014

(30) Foreign Application Priority Data

Oct. 13, 2011  (DE) .......................... 10 2011 084 417
Apr. 24, 2012  (DE) .......................... 10 2012 206 711

(51) Int. Cl.
| | |
|---|---|
| F16D 13/00 | (2006.01) |
| F16H 3/083 | (2006.01) |
| F16D 23/02 | (2006.01) |
| F16D 23/06 | (2006.01) |
| F16D 11/14 | (2006.01) |

(52) U.S. Cl.
CPC .............. *F16H 3/083* (2013.01); *F16D 23/025* (2013.01); *F16D 23/06* (2013.01); *F16D 11/14* (2013.01)

(58) Field of Classification Search
USPC ....... 74/336 R, 339; 192/53.31, 53.32, 53.33, 192/53.34
See application file for complete search history.

(56) References Cited

U.S. PATENT DOCUMENTS

| | | | | |
|---|---|---|---|---|
| 1,935,965 | A * | 11/1933 | Nils .............................. | 192/69.9 |
| 4,732,247 | A | 3/1988 | Frost | |
| 4,998,445 | A * | 3/1991 | Fujiwara ......................... | 74/339 |
| 5,135,087 | A | 8/1992 | Frost | |
| 5,960,925 | A * | 10/1999 | Helms et al. .................. | 192/108 |
| 6,419,063 | B1 | 7/2002 | Smith | |
| 8,104,597 | B2 | 1/2012 | Hackl et al. | |
| 8,171,814 | B2 * | 5/2012 | Martin et al. ................... | 74/342 |
| 8,528,435 | B2 * | 9/2013 | Hackl et al. .................... | 74/339 |

FOREIGN PATENT DOCUMENTS

| | | |
|---|---|---|
| DE | 102005056827 | 5/2007 |
| EP | 2169250 | 11/2012 |
| JP | 0539815 | 2/1993 |

* cited by examiner

*Primary Examiner* — Ha D Ho
(74) *Attorney, Agent, or Firm* — Diederiks & Whitelaw, PLC

(57) ABSTRACT

A synchronization device for a transmission includes a sliding sleeve, a blocking synchronizer ring and a change wheel. In a force flow region between the blocking synchronizer ring and the change wheel, ramps for producing a servo force axial with respect to the shaft are provided on at least one component part.

14 Claims, 7 Drawing Sheets

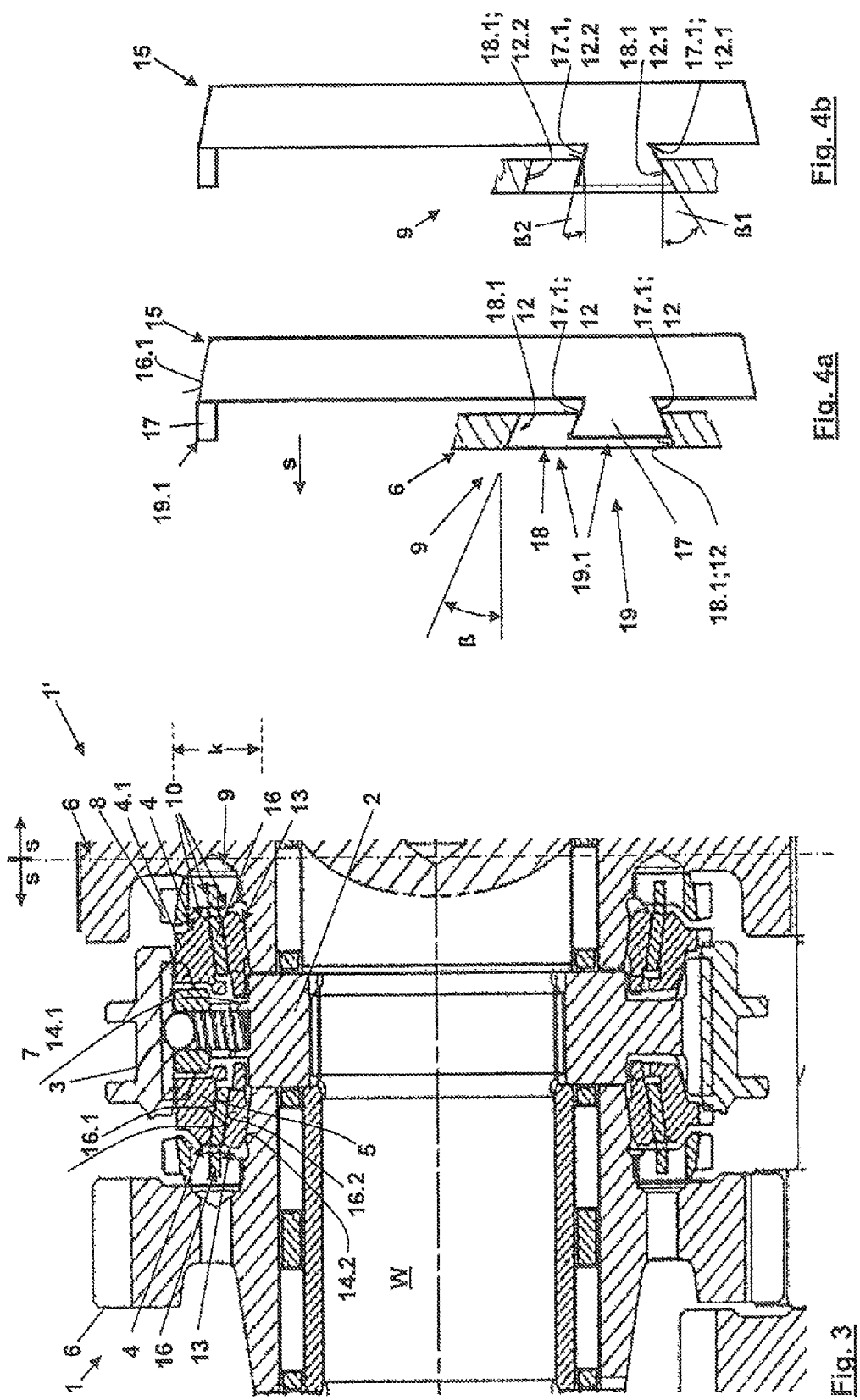

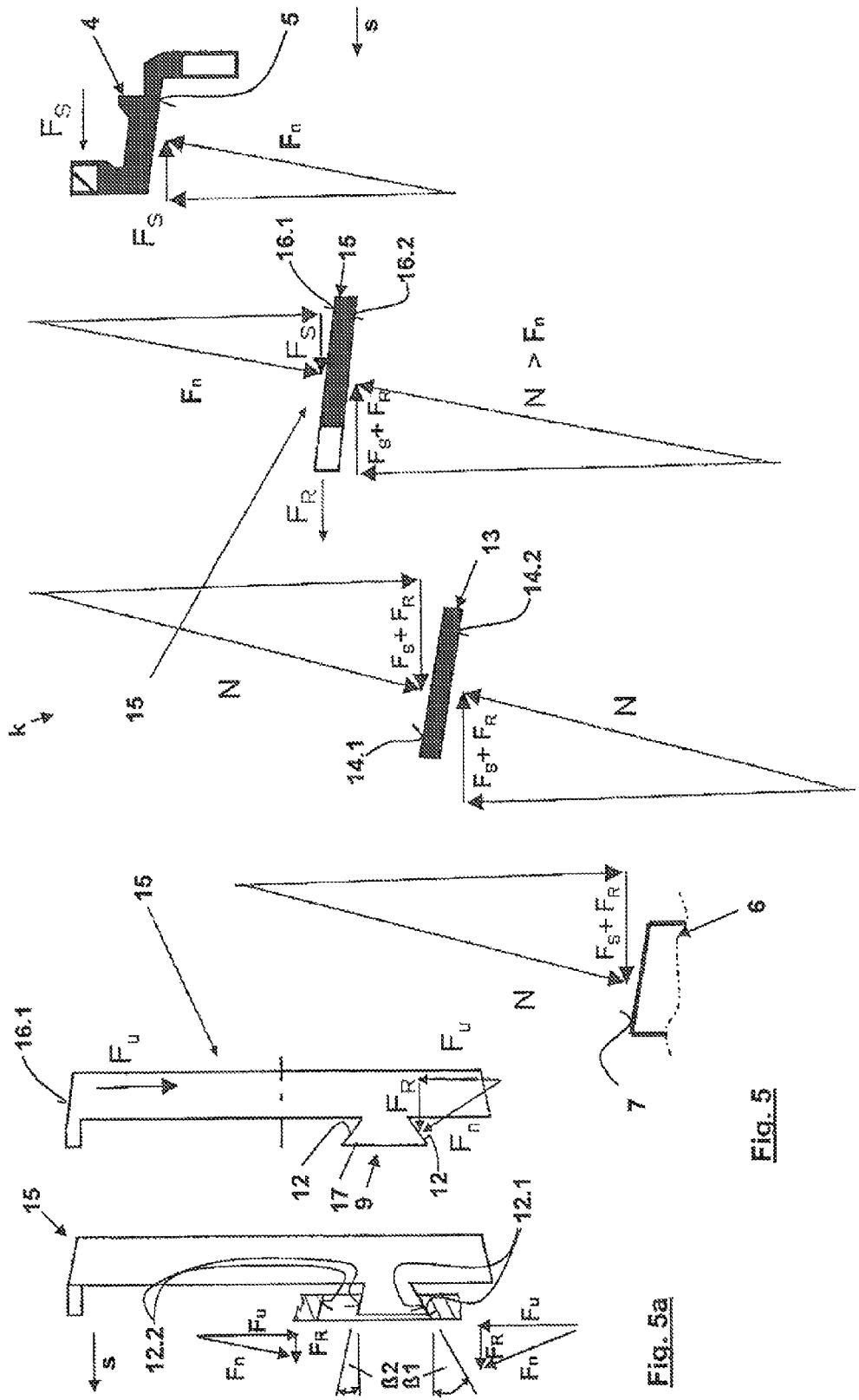

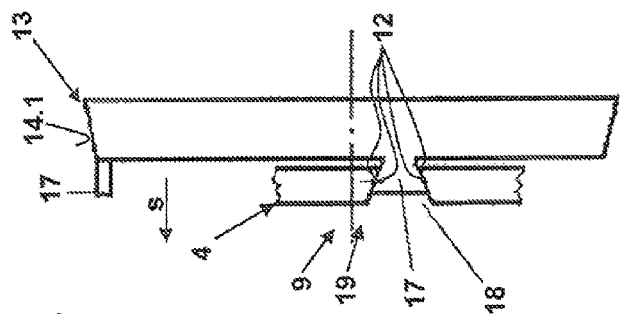
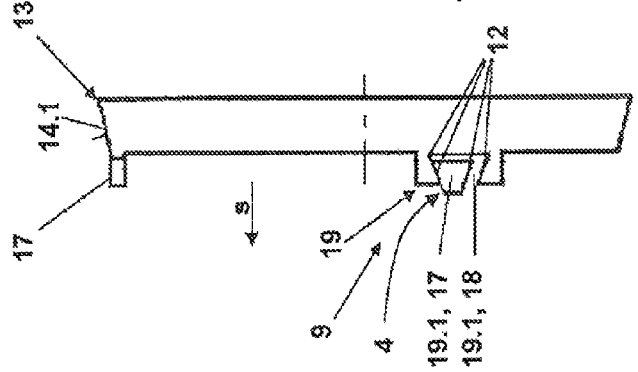
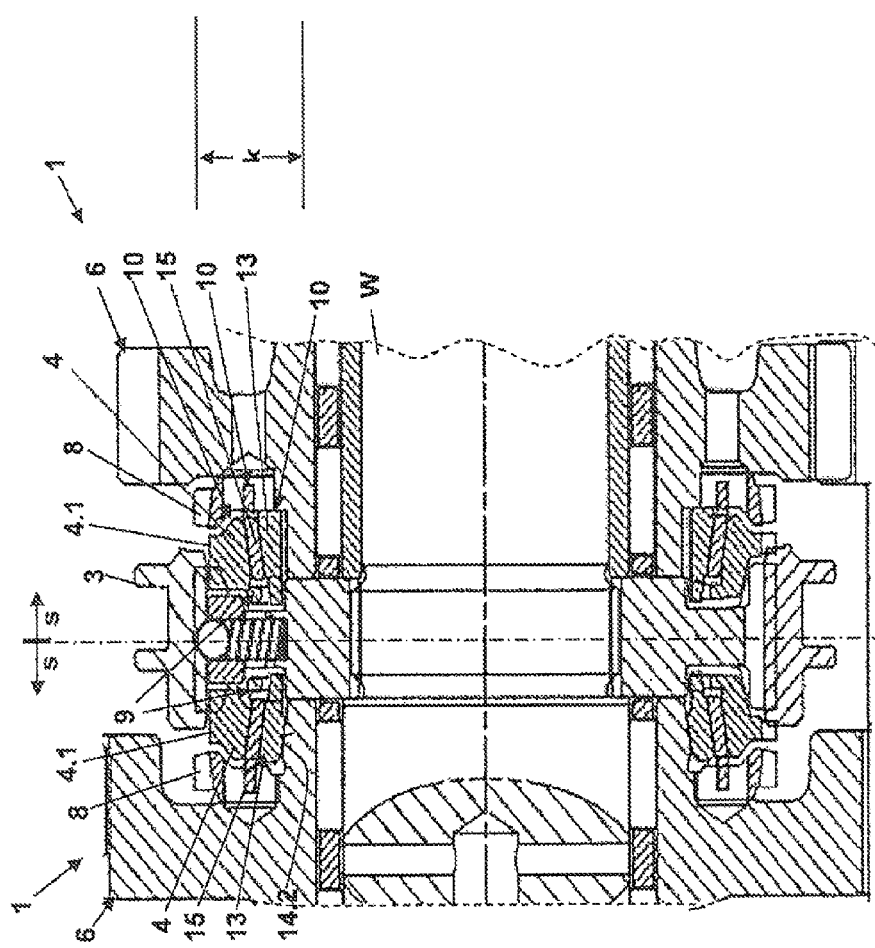

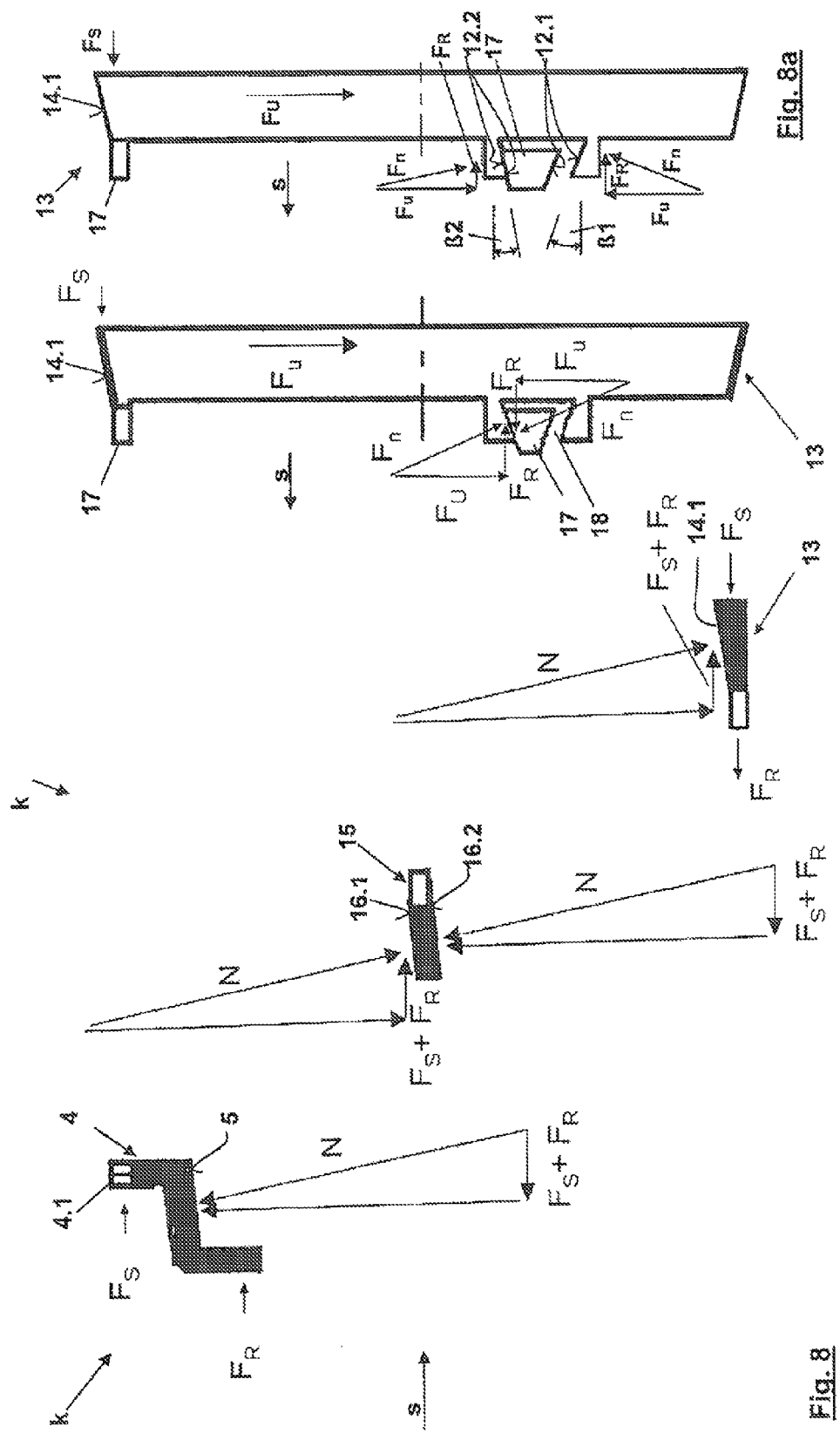

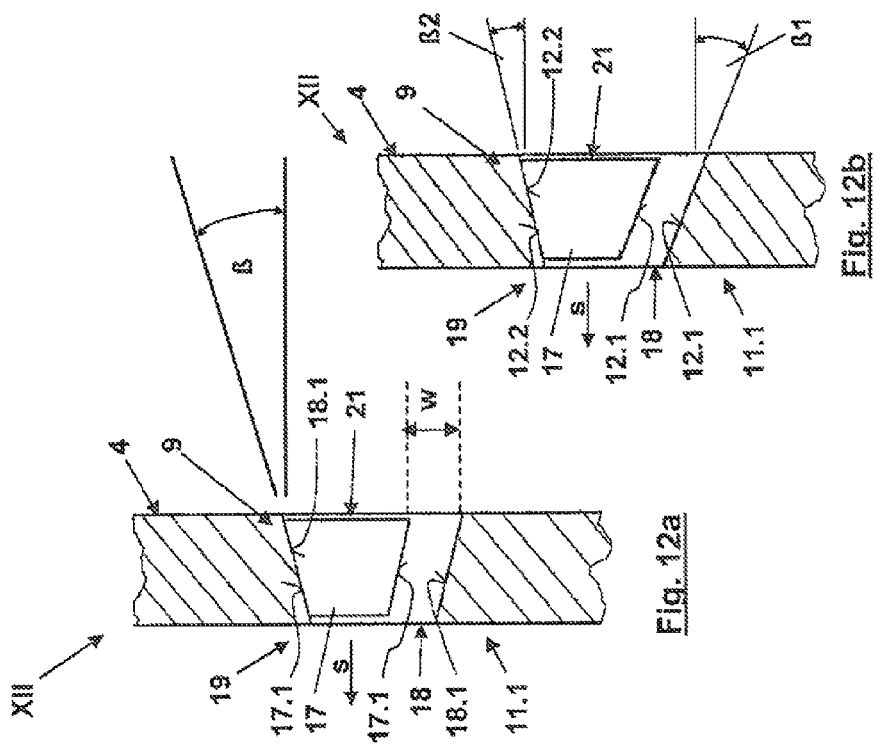
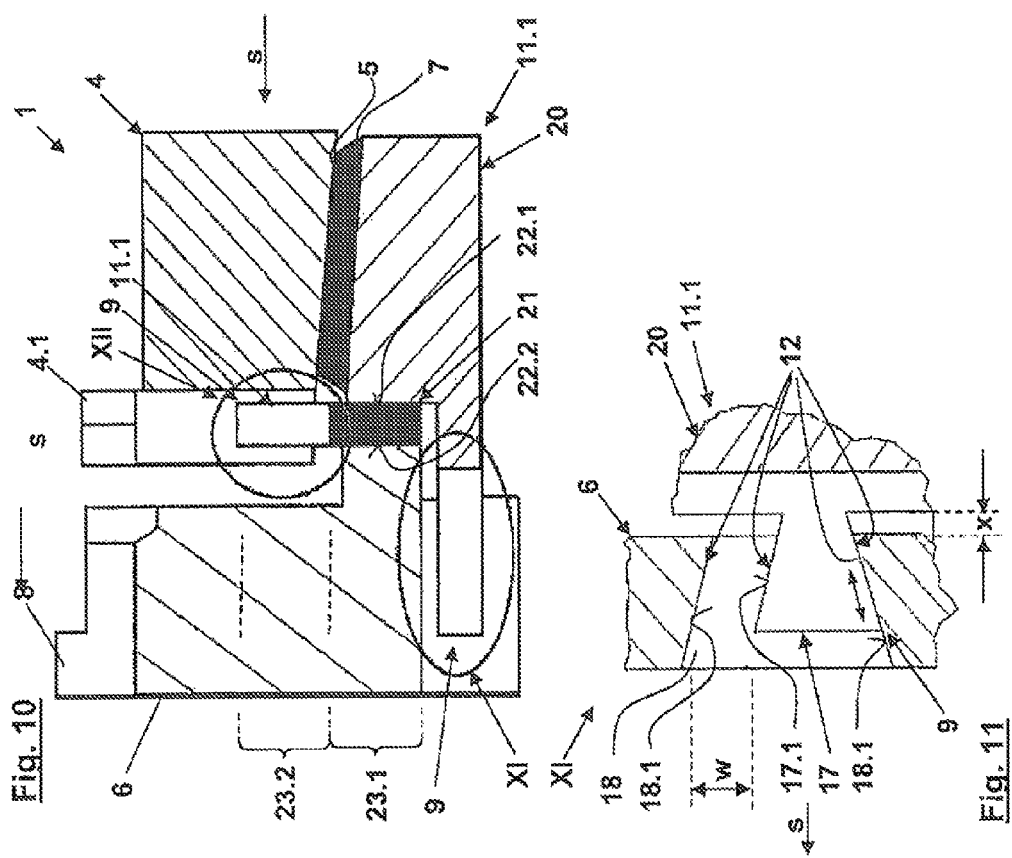

SYNCHRONIZATION DEVICE

CROSS-REFERENCE TO RELATED APPLICATIONS

This application represents a U.S. National Stage application of PCT/EP2012/068952 filed Sep. 26, 2012 which claims benefit and priority to German Patent Application No. 10 2011 084 417.1 filed Oct. 13, 2011 and German Patent Application No. 10 2012 206 711.6 filed Apr. 24, 2012. The entire contents of these applications are incorporated herein by reference.

BACKGROUND OF THE INVENTION

The invention relates to a synchronization device for a transmission, having a sliding sleeve, a blocking synchronizer ring and a change wheel, wherein, in a force flow region between the blocking synchronizer ring and the change wheel, ramps for producing a servo force axial with respect to the shaft are provided on at least one component part.

In known synchronization devices, the sliding sleeve is connected radially on the outside for conjoint rotation to a synchronizer body mounted for conjoint rotation on a shaft, but is arranged in such a way as to allow axial movement toward the associated change wheel, wherein the change wheel is mounted as a free gear on the shaft. To connect the synchronizer body and the change wheel for conjoint rotation by means of teeth on the sliding sleeve which connect the two the rotational speeds of the synchronizer body and the change wheel must be matched or synchronized in a synchronization process. The blocking synchronizer ring is provided with blocking teeth and, for pre-synchronization, is coupled axially with a limited ability for circumferential movement to the synchronizer body. For synchronization, the sliding sleeve is moved against the blocking synchronizer ring in such a way that a force takes effect, introducing an axial shifting force in the direction of the change wheel to be coupled, the blocking synchronizer ring for its part exerting on the change wheel a circumferential force or torque by means of friction in order to brake or accelerate the change wheel to the rotational speed of the synchronizer body for the purpose of matching the rotational speeds. Until synchronism has been achieved, the blocking teeth of the blocking synchronizer ring are aligned relative to the teeth of the sliding sleeve in such a way that the latter strike against the blocking teeth and are thereby blocked axially. When synchronism occurs, the limited circumferential mobility of the blocking synchronizer ring enables it to be turned relative to the teeth of the sliding sleeve in oblique planes into a synchronized position, in which the teeth of the sliding sleeve and of the blocking synchronizer ring and the coupling teeth provided on the change wheel are in axial alignment and the sliding sleeve, reaching over the blocking synchronizer ring with engagement between the teeth, can engage in the coupling teeth and hence produce a connection for conjoint rotation between the synchronizer body and the change wheel.

To reduce the axial shifting force to be introduced via the sliding sleeve and/or to shorten the synchronization process, a self energizer which produces axial servo force is provided in more recent synchronization devices.

U.S. Pat. Nos. 5,135,087 C and 4,732,247 C each describe a synchronization unit of the type in question having the ramps for producing the axial servo force. Here, the blocking synchronizer ring and the synchronizer ring or intermediate cone and the change wheel engage in one another via radial projections with ramps.

As an alternative, it is possible, as described in DE 10 2005 056 827 A1, for the self energizer to be designed as a spring device having spring elements, wherein, when the sliding sleeve is moved against the blocking synchronizer ring, the spring elements press the latter toward the change wheel with a servo force.

In EP 1 219 847 B1 EP 2 169 250 Al and EP 1 900 956 A2, a servo force is produced by means of blocking pieces which are spaced apart circumferentially in a uniform manner and which, for pre-synchronization, simultaneously perform a conventional blocking function to block the sliding sleeve in the case of asynchronism. During synchronization, the blocking pieces are supported in the circumferential direction by means of a ramp as a force transfer surface on a corresponding ramp on the synchronizer body and, via the ramps, couple the axial servo force into the synchronizer ring in the servo force direction. This process is also described in VDI Report No. 1393 from 1998 ("Low Force Boost Concept for Baulk Ring Synchronizers"). The disadvantages with this, apart from a complex structure, are susceptibility with respect to axial tolerances and increased wear of the synchronizer rings. Owing to the angular positions of the blocking faces, these must be of correspondingly wide design and this, in turn, requires along sliding transfer phase and hence a long stroke of the sliding sleeve and ultimately an increased expenditure of force.

SUMMARY OF THE INVENTION

It is the object of the invention to provide a synchronization device of the type in question which allows the production of a servo force optimized for the shift operation. The synchronization device should nevertheless be of simple construction and furthermore have little susceptibility in respect of axial tolerances. Low susceptibility to wear of the synchronizer rings should be made possible. In addition, the synchronization process should be shortened.

According to the invention, the stated object is achieved by the features of claim 1. Advantageous developments are described in the dependent claims. The stated object is already achieved by arranging first ramps for servo force production when downshifting from a higher gear at a first angle to the shaft, and second ramps for servo force production when upshifting from a lower gear at a second angle to the shaft, wherein the first angle is unequal to the second angle.

During synchronization, the asynchronism of the component parts with the interacting ramps means that a circumferential force acts on the ramps, bringing about an axial servo force in accordance with the axial angular setting thereof. This is explained in greater detail below. According to the invention, provision is made for the first ramps to be of asymmetrical design with respect to the second ramps. It is thus possible during synchronization for an axial servo force to be produced by means of the first ramps which differs from the axial servo force produced by way of the second ramps owing to the different angular setting relative to the angular setting of the second ramps. Owing to the asymmetry of the ramps, different servo forces can be produced when shifting to a particular change wheel. By means of the different ramps, it is thus possible to take account of differences as regards the required servo forces for different gears and/or as regards the "shifting direction", i.e. whether the ramps producing servo forces are being used to shift to the relevant gear from a higher or a lower gear. Since only a difference in the axial setting of the first and second ramps is necessary here, the construction of the synchronization device is kept correspondingly simple.

Although it is possible, by means of an increased servo force, to make a corresponding reduction in a required shifting time during a synchronization process, increased wear may occur at the same time. By virtue of the asymmetric ramps, the servo force and the shifting time can be selectively optimized in relation to the shift operation, i.e., depending on whether this is "upshifting" or "downshifting". Asymmetry of the energization ramps is particularly advantageous if there are large differences in respect of a required axial force between upshifting and downshifting in a particular gear.

The magnitude of the angular setting of the ramps per se and the asymmetry thereof are highly dependent on the structural parameters of the respective transmission. An expected shifting behavior of a driver cane furthermore be taken as a criterion, e.g. whether rapid, harsh, "sporty" shifting or more gentle shifting is desired. To this extent, the shifting force and the shifting time are interlinked as significant factors in shifting. These factors can be mathematically combined as a product of the shifting force and the shifting time to give a "shift integral". This shift integral can thus be set selectively by means of the magnitude of the angular setting of the asymmetric ramps.

In currently conventional manual transmissions, there can be large differences in force between upshifting and downshifting, especially into a lower gear. This applies especially to the first gear and, where present, for a "crawler" gear. It is advantageous if the first angle is greater than the second angle when the change wheel in the transmission is provided for a first gear or a crawler gear. This means that where the component parts engaging in one another via the ramps so as to exert a force have the same rotational speed difference and hence the same circumferential force, a greater axial servo force is produced when downshifting, e.g. from the second gear to the first gear, than when upshifting from an N gear (neutral) or the crawler gear to the first gear. In certain manual transmissions, the first angle can have a magnitude which is a multiple of the magnitude of the second angle. The first angle can be configured to be up to four times, advantageously up to three times or twice as great as the second angle.

The first angle can be less than the second angle when the change wheel in a transmission is provided for a gear that is higher, for example, than the first gear or the second gear. This means that where the component parts engaging in one another via the ramps so as to exert a force have the same rotational speed difference and hence the same circumferential force, a lesser axial servo force is produced when downshifting, e.g. from the fourth gear to the third gear, than when upshifting from the second gear to the third gear. The first angle can be less than the second angle by at least 5°, advantageously by at least 10° or 20°. The first angle can be greater than the second angle by a maximum of 35°. By means of the ramps provided in the force flow region, automatic intensification of the shifting force, self energization, is produced. A circumferential force acting on the component part gives rise to the axial servo force at the ramps. The component part can be supported in the direction of the blocking synchronizer ring or of the change wheel. The blocking synchronizer ring and the change wheel are included in the force flow region. The component part can be the blocking synchronizer ring and/or the change wheel. The blocking synchronizer ring can be supported directly on the change wheel via the ramps. In addition or as an alternative, the component part can be arranged between the blocking synchronizer ring and the change wheel. Owing to the arrangement of the ramps, which is explained in greater detail below, axial tolerances are less serious, as in the prior art. Axial tolerances occurring to a slight extent between or at the change wheel and/or the blocking synchronizer ring can even be compensated by sliding at the ramps.

By means of the arrangement of the self energizer in the force flow region, it is possible in general to lower the level of a pre-synchronization force. As a result, force spikes, which normally occur in the shifting force characteristic with respect to time during the synchronization process, especially during the alignment of the teeth of component parts to be connected for conjoint rotation, are mitigated. Overall, a uniform force characteristic during the synchronization process can be achieved, which makes shifting of the transmission easier and more pleasant for a user.

By means of the measure according to the invention, it is possible, as an advantageous simplification of the construction of the synchronization device, to dispense with the additional function of the blocking piece, that of self energization, and/or with additional spring elements on the synchronizer body, for example. Owing to the arrangement according to the invention of the ramps, the self energization can be implemented even in synchronization devices without additional blocking pieces. Moreover, this arrangement means that the self energizer does not act directly against the blocking teeth of the synchronizer ring with increased wear on the synchronizer ring, as in the case of blocking pieces with a self energization function. Since the self energization is not brought about by means of blocking pieces being provided, as in the prior art, it is possible for the blocking pieces, where provided, to be of correspondingly smaller dimensions circumferentially, thereby making it possible to avoid an extended sliding transfer phase of the sliding sleeve. In this force flow region, the axial forces during synchronization are transferred substantially by friction at friction surfaces. A pre-synchronizer that is provided for matching the rotational speed of the sliding sleeve and the change wheel can be arranged at least in part in the above-defined force flow region. This pre-synchronizer can form a structural unit with the self energizer. Force transfer from the sliding sleeve to the blocking synchronizer ring is not included in the force flow region defined here. The precise arrangement of the ramps in the force flow region between the blocking synchronizer ring and the change wheel depends on the fundamental construction of the synchronization device in this force flow region. In principle, the servo force can be produced where component parts are coupled in terms of the dynamics of movement by means of plug-in connections, for example. These component parts can be conventional component parts of a synchronization device.

The synchronization device can be designed as a single-, double- or triple-cone synchronizer, for example. It is possible, for example, for at least one component part and/or one group of component elements comprising at least one component element to be arranged between the blocking synchronizer ring and the change wheel. As explained below it is possible here for the component part to be a conventional component part of the single-, double- or triple-cone synchronizer, but one which is modified in design to form the ramps of the self energization system. This component part and/or the component element of the group of component elements can be supported in the direction of the blocking synchronizer ring or in the direction of the change wheel with a servo force action by means of the ramps in order to convert a circumferential force ($F_U$) acting on said component part and/or component element into the servo force ($F_R$). To compensate axial tolerances, the ramps can also come into contact with one another within a certain axial region, and this reduces production costs accordingly. The size of this axial region depends inter alia on the axial extent of the ramps. The ramps can rest against one another over as large as possible a section of their axial extent, reducing wear. Any axial tolerances of the individual component parts and/or of the group of component elements which do occur can be compensated to a small extent in an uncomplicated manner by means of sliding on the ramps.

For more rapid compensation of the rotational speeds of the synchronizer body and the change wheel, the blocking synchronizer ring can have a first friction cone surface at the rear in the servo force direction and/or the change wheel can have a second friction cone surface at the front in the servo force direction as respective friction surfaces. During synchronization, these friction cone surfaces can engage on one another with a frictional effect and can engage in one another with a self centering effect. Owing to the servo force, the blocking synchronizer ring and the change wheel can be pressed more powerfully against one another, increasing the friction torque at the friction cones thereof, thereby making it possible to shorten the synchronization process and/or to reduce the axial force to be introduced into the sliding sleeve for the synchronization process. A correspondingly reinforced centering action at the interengaging cones can furthermore be achieved.

The ramps can each have a surface normal with a direction component axial with respect to the shaft and a direction component circumferential with respect to the shaft. It is thus possible, by means of the setting of the force transfer surfaces, i.e. by means of the magnitude of the axial direction component of the surface normals of the force transfer surfaces, to set the level of self energization or of the axial servo force. The steeper the setting of a force transfer surface, i.e. the greater the included angle between the force transfer surface and the servo force direction, the higher is the respective proportion of the axial force component. However, the setting of the force transfer surfaces should not exceed a certain angle to ensure that self locking cannot occur. An optimum angle depends heavily on the design circumstances. To enable interacting ramps to come into surface contact in a manner which is favorable in terms of force mechanics, said surfaces can have the same setting.

In terms of design, the ramps can be on two axially interengaging transfer elements arranged at least substantially on a radius, wherein said transfer elements can be regarded as a transfer unit. The transfer elements can be an axial opening having circumferential inner side faces as ramps and an axial projection having circumferential outer side faces as ramps. The projection can engage into an associated opening in such a way that, depending on the currently acting torques, it rests in a slidable manner on one of the circumferential inner side faces of the opening by means of one of its circumferential outer side faces. The projection preferably extends axially into the opening, which is preferably open in an axial direction. The two transfer elements can thus form a plug-in connection. From the mechanics of forces, it can be inferred that the surface normal of the ramp of the component part which is to be pushed in the servo force direction points with an axial direction component counter to the servo force direction. For engagement, the transfer elements of a transfer unit can expediently be arranged with a uniform radial spacing with respect to the shaft. The projection and the opening can have a dovetail or trapezoidal profile, e.g. that of an isosceles trapezium, relative to a circumferential-axial plane. The circumferential inner side face on which the projection rests during synchronization depends ultimately on the direction of the differential rotational speed to be synchronized toward synchronism, i.e., whether downshifting from a higher gear or upshifting from a lower gear to the change wheel associated with the synchronization unit is taking place. It can be advantageous here if the servo force produced during downshifting differs in magnitude from that produced during upshifting. This can be achieved by a different setting of the inner side faces of the opening and, accordingly, of the respectively associated circumferential outer sides of the projections relative to the servo force direction. It is thereby possible to produce a servo force in one direction of rotation which differs from the servo force g produced in the opposite direction of rotation in order to match the shift to be carried out.

The self energizer can have at least two, preferably three, transfer units, which are advantageously spaced apart circumferentially in a uniform manner. For example, the component part or the component element of the group of component elements can have at least two axial openings with circumferential inner sides as ramps or at least two axial projections with circumferential outer side faces as ramps.

In a preferred embodiment of the synchronization device, a synchronizer ring can be provided axially between the blocking synchronizer ring and the change wheel. A component part designed as an intermediate cone can furthermore be provided axially between the two synchronizer rings. As a friction surface, the synchronizer ring can have a third friction cone surface at the front in the servo force direction in the case of a double-cone synchronizer and, in the case of a triple-cone synchronizer, it can additionally have a third friction cone surface at the rear in the servo force direction, by means of which the synchronizer ring is supported on the change wheel. In the case of the double-cone synchronizer, the synchronizer ring can be supported at the front face on the change wheel and, in the case of the triple-cone synchronizer, can be supported on the second friction cone surface of the change wheel via its rear third friction cone surface. For its part, the intermediate cone can have two fourth friction cone surfaces, a fourth friction cone surface at the rear in the servo force direction and a fourth friction cone surface at the front in the servo force direction. The intermediate cone can be supported at the front in the servo force direction on the first friction cone surface of the blocking synchronizer ring by means of its front fourth friction cone surface and can be supported at the rear in the servo force direction on the third front friction cone surface of the synchronizer ring by means of its rear fourth friction cone surface.

In general, component parts which are coupled in terms of movement by means of plug-in connections in the conventional double-cone synchronizer and triple-cone synchronizers can in each case be coupled to one another for servo force production both in the double-cone synchronizer and in the triple-cone synchronizer. For this purpose, the plug-in connections can be provided with the ramps, at which the component parts rest against one another during synchronization while producing the servo force.

For example, the synchronizer ring can be supported via ramps or via a transfer unit or transfer units on the blocking synchronizer ring. In this way, the blocking synchronizer ring can be pulled against the synchronizer ring in the servo force direction by means of the servo force during synchronization. In this way, the two synchronizer rings can be pulled against one another by means of the servo force during the synchronization process. In addition, intensified braking toward synchronism can be brought about, hence shortening the synchronization process, by increasing the friction at the intermediate cone mounted between them. To produce the axial servo force, the intermediate cone can be supported on the change wheel additionally or exclusively via ramps or via a transfer unit or a plurality of transfer units. In this arrangement, axial projections can each extend from the intermediate cone into associated axial openings provided in the change wheel to provide the plug-in connection between the intermediate cone and the change wheel. Since the synchronizer ring can be arranged with a frictional effect axially between the intermediate cone and the change wheel, the intermediate cone can press the synchronizer ring more strongly against the second friction cone surface of the change wheel by means of its rear fourth friction cone surface and can thus accelerate the synchronization process.

Reversing the arrangement of the openings and projections, it is possible in all the embodiments of the synchronization device to swap the arrangement of the openings and projections in/on the component parts interacting to produce the servo force. The projections can be of tab-like design as axial and/or radial extensions on the relevant component part or component element.

To ensure that the respective component part is taken along with the synchronizer body or with the change wheel, provision can normally be made for this to engage laterally by means of tab-like projections or openings having a straight, i.e. non-tapering and/or widening profile in each case in openings or projections provided on the synchronizer body or on the change wheel. For example, the two synchronizer rings and the intermediate cone with the change wheel can be connected to one another to provide a rotary connection via a plug-in connection comprising a projection and an opening, each with a straight profile, in conventional double-cone synchronizers or triple-cone synchronizers. In the case of the plug-in connection between the synchronizer rings, the projections, of which there are generally three, can be arranged radially on the outside, can extend at least approximately radially inward into the opening provided and, in the process, can reach over the intermediate cone. In the synchronizing device according to the invention, provision can be made for the projection and the opening of this plug-in connection to have the ramps described. This allows a considerable minimization of the design outlay for the self energizer. As explained above, the projection and/or the opening can have a dovetail profile relative to the circumferential-axial plane, with rear engagement features and/or a trapezoidal profile, e.g. an isosceles trapezium profile.

In a preferred design of the synchronization device, the group of component elements can have as one component element a friction cone element having the second friction cone surface. The friction cone element can be designed as a discrete component element. The friction cone element can be supported on the change wheel via ramps and on the blocking synchronizer ring via the second friction cone surface. The group of component elements can furthermore have an energizing element with friction surfaces, a friction surface at the front in the servo force direction, in which the energizing element is supported on the friction cone element counter to the servo force direction, and a friction surface at the rear in the servo force direction, in which the energizing element is supported on the change wheel in the servo force direction. The friction cone element can reach axially over the energizing element radially to the inside of the energizing element. Since the friction cone element is supported on the change wheel via the ramps, it is possible during synchronization to produce the servo force, by means of which, via the front friction surface, the friction cone element presses the rear friction surface of the energizing element against the change wheel. Intensified braking toward synchronism can thereby be accomplished at both friction surfaces.

The energizing element can furthermore be supported via ramps on the blocking synchronizer ring or, in the case of the triple synchronizer, on the synchronizer ring. By means of the ramps on the energizing element and the blocking synchronizer ring or synchronizer ring, an additional servo force can be produced. This can act with a friction-intensifying effect, via the first friction cone surface of the blocking synchronizer ring or via the rear friction cone surface of the synchronizer ring, on the second friction cone surface of the friction cone surface element. It is thereby possible to exert a further positive or negative acceleration torque toward synchronism on the friction cone element.

Here, the friction cone element can be designed as a discrete component part with the second friction cone surface, which is not connected integrally to the change wheel in contrast to the above-described customary embodiments of the synchronization device but is "separated" structurally from it and is connected to the change wheel by plug-in connections. Nevertheless, however, all the above-described modes of construction of the synchronization device remain possible in design terms: in the case of the single-cone synchronizer, the blocking synchronizer ring can be coupled to the change wheel. In the case of the double- and triple-cone synchronizer, the intermediate cone can be coupled to the change wheel and/or the blocking synchronizer ring can be coupled to the synchronizer ring, in each of these couplings, it is possible to produce self energization in addition to that of the friction cone element.

The energizing element is preferably of simple construction in the manner of a ring-shaped disk, in particular an annular disk. The friction surfaces thereof are preferably arranged perpendicularly to the shaft or to the servo force direction. In this arrangement, it can have a radially outer ring region with the friction surfaces and a radially inner ring region with the projections. These projections, which are preferably arranged spaced apart circumferentially in a uniform manner on a peripheral circle, can extend counter to the servo force direction into the axial openings provided in the blocking synchronizer ring. To this extent, the energizing element can have a ring of said projections. Reversing the arrangement, the openings can be arranged in the energizing element, and the associated projections can be arranged on the first synchronizer element.

BRIEF DESCRIPTION OF THE DRAWINGS

The present invention is explained in greater detail below by means of a number of embodiments of the synchronization device, which are shown in a drawing. In the drawing:

FIG. 3 shows a longitudinal section through a first embodiment of two synchronization devices according to the invention arranged symmetrically on a shaft, in the form of a triple-cone synchronizer with an intermediate cone and a gearwheel, FIG. 4a shows a longitudinally sectioned region with the intermediate cone and the gearwheel according to FIG. 3, FIG. 4b shows a longitudinally sectioned region as in FIG. 4a but with a different embodiment of the intermediate cone and the gearwheel, FIG. 5 shows a schematic illustration of forces in individual component parts of the first embodiment of the synchronization device according to FIG. 3, FIG. 5a shows an individual detail view of the gearwheel and the intermediate cone according to FIG. 4b, FIG. 6 shows a longitudinal section through a second embodiment of two synchronization devices according to the invention arranged on the shaft, in this case in the form of a triple-cone synchronizer with an outer blocking synchronizer ring and an inner synchronizer ring, FIGS. 7a and 7b each show a longitudinally sectioned region with the two synchronizer rings, which are connected in different ways, FIG. 8 shows a schematic illustration of forces on individual component parts of the second embodiment, in this case of the synchronization device on the right in FIG. 6 in the form of a double-cone synchronizer, FIG. 8a shows an additional schematic illustration of interengaging cone rings, FIG. 10 shows a schematic longitudinally sectioned detail X in accordance with FIG. 9, FIG. 11 shows a longitudinally sectioned detail XI in accordance with FIG. 10, FIG. 12a shows a longitudinally sectioned detail XII in accordance with FIG. 10, and FIG. 12b shows a longitudinally sectioned detail XII as in FIG. 12a but with modified ramps.

DETAILED DESCRIPTION OF THE PREFERRED EMBODIMENTS

Figure 2:
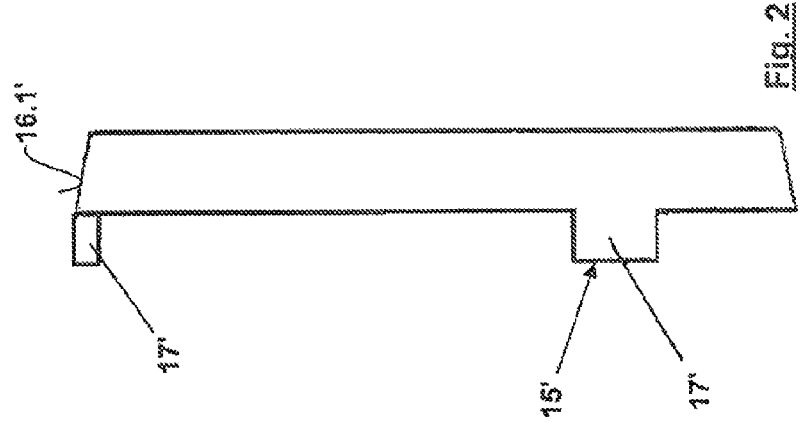
FIG. 2 shows a longitudinal section through the intermediate cone shown in FIG. 1.
Figure 1:
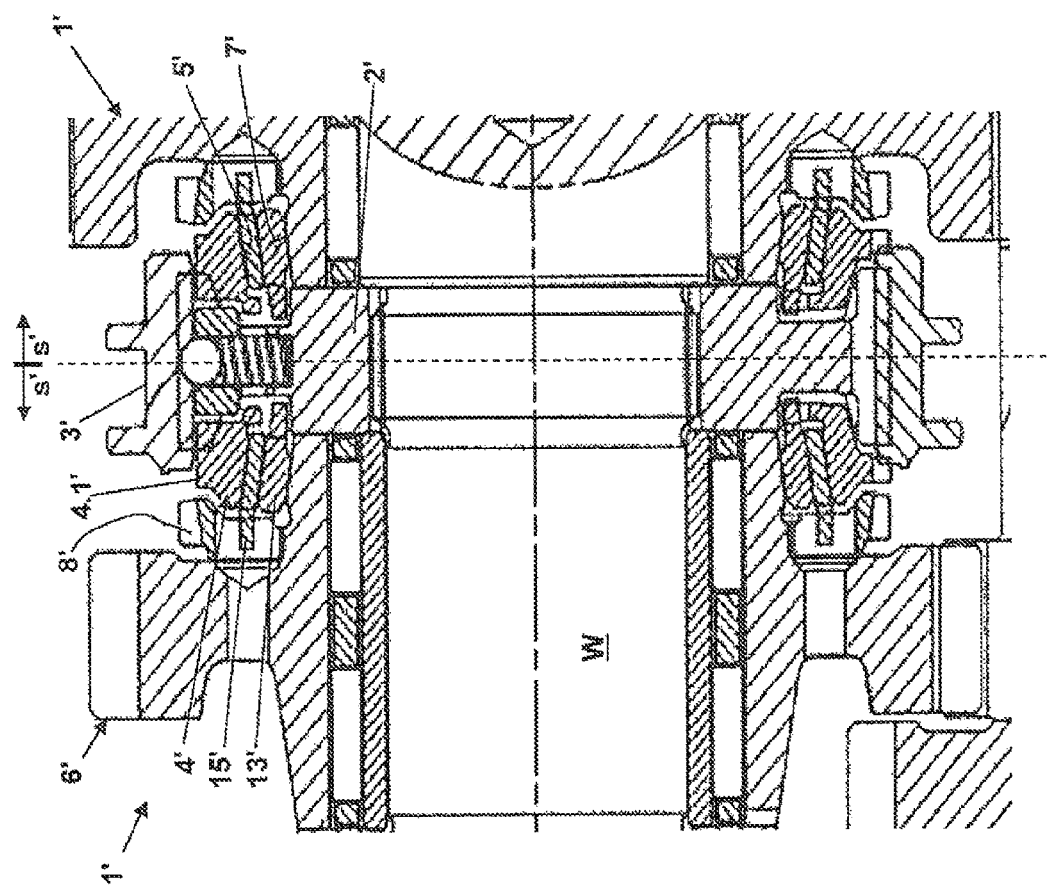
FIG. 1 shows a longitudinal section through two synchronization devices arranged symmetrically on a shaft as prior art, in this case in the form of a triple-cone synchronizer with an intermediate cone.

In FIGS. 1 to 12, various embodiments of a synchronization device 1, 1' are shown in various longitudinal sections and partial views, wherein a conventional synchronization device 1' is depicted in FIGS. 1 and 2 and different embodiments of the synchronization device 1 according to the invention are depicted in the other figures. (In the text which follows, the reference signs which refer to a component part of the synchronization device 1' in accordance with the prior art are indicated by an apostrophe). Each of the figures shows two synchronization devices 1, 1', which are arranged in mirror symmetry with respect to one another on a shaft W.

Arranged concentrically with the shaft W, the synchronization device 1, 1' has a synchronizer body 2, 2', a sliding sleeve 3, 3', a blocking synchronizer ring 4, 4' with a first friction cone surface 5, 5' as a friction surface and blocking teeth 4.1, 4.1' as well as a change wheel 6, 6' with a second friction cone surface 7, T as a friction surface and coupling teeth 8, 8'. The synchronization devices 1, 1 illustrated are of conventional construction and are designed in such a way that the sliding sleeve 3, 3' can be moved axially in both directions with respect to a change wheel 4; 4'.

The synchronization device 1 according to the invention furthermore has a self energizer 9 for producing a servo force $F_R$ axial with respect to the shaft W and having a servo force direction s from the synchronizer body 2 to the change wheel 6. The self energizer 9 is arranged in a force flow region k of the synchronization device 1 between the blocking synchronizer ring 4 and the change wheel 6. What is referred to here is thus the force flow region k from the blocking synchronizer ring 4 up to the change wheel 6. With the effective force ratios, the force flow in the force flow region k is intended as an example for the first and second embodiment of the synchronization device 1 according to the invention in FIGS. 5 and 8, wherein the component parts 10 producing the servo force are shown separately from one another in order to illustrate the forces acting on said component parts 10.

As explained above, the sliding sleeve 3 is guided in the servo force direction a during the shift operation in order to connect the synchronizer body 2 and the change wheel 6 for conjoint rotation, involving tooth engagement via the coupling teeth 8 of the change wheel 6. Synchronism of the change wheel 6 and the synchronizer body 2 is required for alignment of the teeth 8. The synchronizer body 2 is arranged for conjoint rotation on the shaft W, and the change wheel 6 is arranged as a free gear on said shaft. Braking or acceleration of the change wheel 6 on the shaft W by the synchronizer body 2 is accomplished by force transmission at the friction cone surfaces 5, 7. To accelerate the synchronization process, the axial servo force $F_R$ is produced by means of the self energizer 9, said force acting on the synchronization device 1 in the servo force direction s in addition to an axial shifting force $F_S$ introduced from outside via the sliding sleeve 3. Owing to a resultant increase in friction at the friction cones 5, 7, the synchronization process during shifting can be shortened and/or a lower shifting force $F_S$ to be applied by the user is required.

Figure 9:
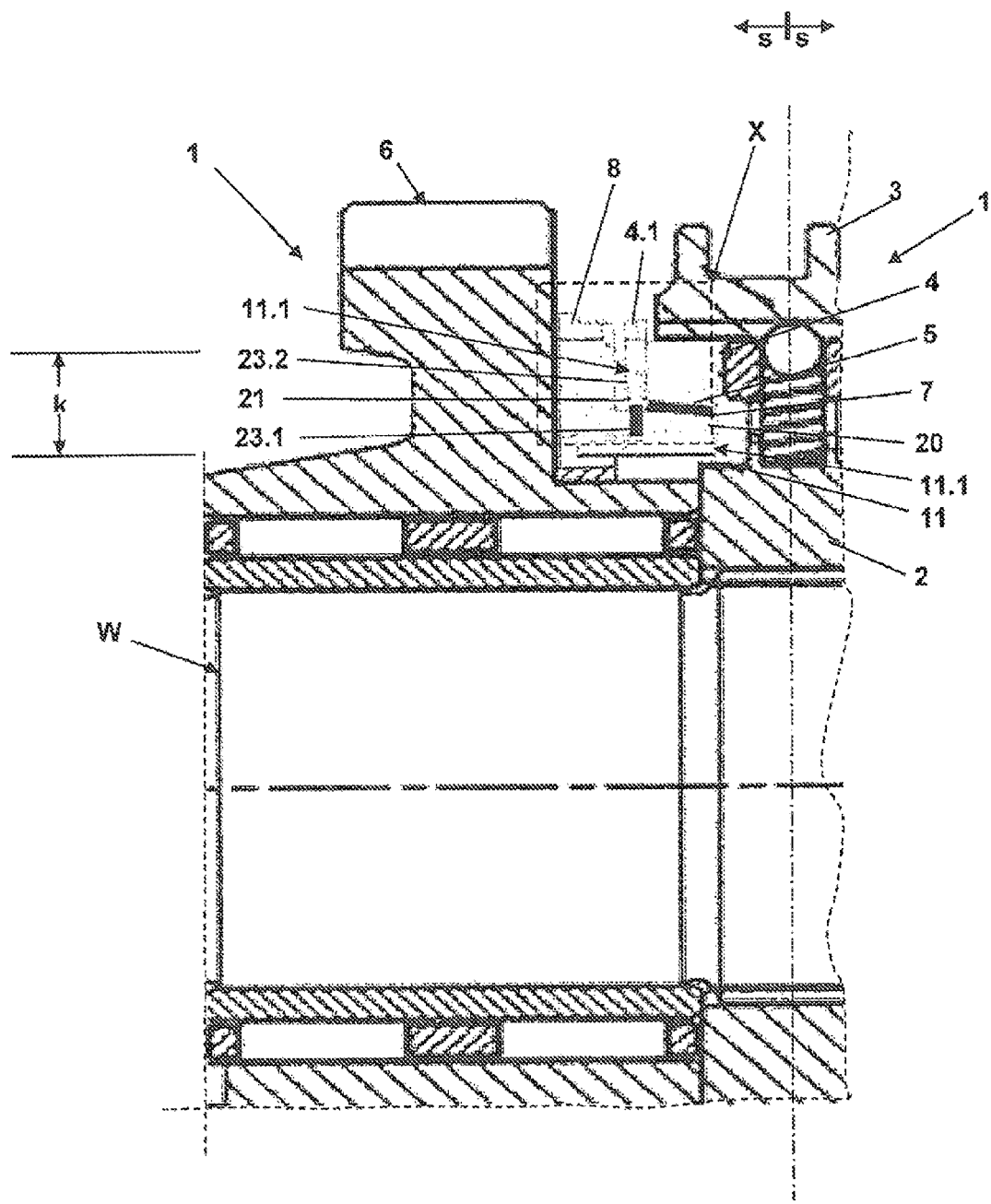
FIG. 9 shows a longitudinal section through a third embodiment of two synchronization devices according to the invention arranged symmetrically on a shaft, in this case in the form of a single-cone synchronizer with a first synchronizer ring, a gearwheel and a cone element.

At least one component part 10 concentric with the shaft W or one group 11 of component elements, which is concentric with the shaft W and, in this case, has two component elements 11.1 in accordance with FIG. 9, is arranged in the force flow region k, depending on the respective embodiment of the synchronization device 1 which is shown here. Certain component parts 10 or component elements 11.1 are coupled to the change wheel 6 or the blocking synchronizer ring 4 via ramps 12 in the synchronization process, allowing forces to take effect. On contact with the ramps, a circumferential force $F_U$ acting on component 10 or component element 11.1 gives rise to a servo force $F_R$ in the case of asynchronism. In order to be able to produce the servo force $F_R$ in the servo force direction s, the ramp 12 of that component part of two component parts 10 coupled via ramps 12 which is at the rear in the servo force direction s must face counter to the servo force direction s with an axial direction component $f_a$.

As indicated by way of example on the left in FIG. 5, there is a normal force $F_n$ with a direction component $F_a$ axial with respect to the shaft W and a direction component $F_u$ circumferential with respect to the shaft W acting on each of the ramps 12. The ramps 12 are thus each arranged at an angle β to the servo force direction s, said angle being indicated by way of example in FIGS. 4 and 12. The proportional ratio of the servo force $F_R$ can be adjusted via the size of the angle β.

FIGS. 3 to 5 relate to a first embodiment of the synchronization device 1 according to the invention. This is designed as a "triple-cone" synchronizer. In the force flow region k, it has, as additional component parts 10, a synchronizer ring 13 with a front third friction cone surface 14.1 and a rear third friction cone surface 14.2 as respective friction surfaces and a component part 10 designed as an intermediate cone 15 and having a front fourth friction cone surface 16.1 and a rear fourth friction cone surface 16.2 as respective friction surfaces. The intermediate cone 15 is arranged axially between the two synchronizer rings 4, 13 and, at the front in the servo force direction s, is supported on the first friction cone surface 5 of the blocking synchronizer ring 4 by means of its front fourth friction cone surface 16.1 and, at the rear in the servo force direction s, is supported on the front third friction cone surface 14.1 of the synchronizer ring 13 by means of its rear fourth friction cone surface 16.2. It furthermore extends into an associated opening 18 provided for it on the change wheel 6, forming a plug-in connection by means of, in this case three, tab like projections 17 spaced apart circumferentially in a uniform manner, and is supported there on the change wheel 6 via ramps 12 provided on the latter (FIGS. 4a, 4b). Thus, the projection 17 and the associated opening 18 form a transfer unit 19 with the projection 17 and the opening 18 as transfer elements 19.1. The projections 17 each have a dovetail shape with respect to a circumferential-axial plane (FIGS. 4a, 4b).

The prior-art synchronization device 1 illustrated in FIGS. 1 and 2 is also designed as a triple-cone synchronizer with an intermediate cone 15' having a front friction cone surface 16.1'. An axial plug-in connection is formed by means of projections 17' arranged on the intermediate cone 15' and openings 18' arranged on the change wheel 6'. However, no self energizer, in particular no ramps for producing the servo force, are provided. With respect to an axial-circumferential plane, the projections 17' have a right angled profile. A comparison with the embodiment of the synchronization device 1 according to the invention illustrated in FIGS. 3 to 5 shows that a prior-art synchronization device 1' can be converted to the synchronization device 1 according to the invention with little effort by replacing the intermediate cone and the change wheel.

The force ratios at the individual component parts 10 in the force flow region k are illustrated schematically in FIG. 5. On the right in FIG. 5 is the blocking synchronizer ring 4, which acts by means of its first friction cone surface 5 on the fourth friction cone surface 16 of the intermediate cone 15. This acts on the front third friction cone surface 14.1 of the synchronizer ring 13, said surface here being illustrated to the left thereof, and the latter surface, in turn, acts on the second friction cone surface 7 of the change wheel 6. For greater ease of understanding, the regions in which friction work occurs are shown in black here and in the other figures. In addition, the intermediate cone 15 is additionally shown in a detail illustration on the left in FIG. 5, with the projections 17 emphasized in order to highlight the production of the servo force $F_R$.

More specifically, in a sequence from right to left, a shifting force $F_S$ is introduced into the blocking synchronizer ring 4 by means of a sliding sleeve (not shown in FIG. 5). The first friction cone surface 5 of the blocking synchronizer ring 4 is thus acted upon by a normal force $F_N$, which is made up of the shifting force $F_S$ and a radial force $F_R$. This normal force $F_N$ is transferred to the intermediate cone 15. Since the projection 17 is supported in the circumferential direction, via its ramp 12, on the change wheel 6 at the ramp of the opening 18 (said ramp not being shown explicitly here), the additional axial servo force $F_R$ is produced, which in turn increases the normal force $F_N$ to the normal force N at the intermediate cone 15 and is transferred to the front third friction cone surface 14.1 of the synchronizer ring 13 and, from the synchronizer ring 13, to the second friction cone surface 7 of the change wheel 6. The servo force $F_S$ thus acts via the increased normal force N on the friction cone surfaces 16.2, 14.1 and 14.2, 7. Since the intermediate cone 15, the change wheel 6 and the two synchronizer rings 4, 13 are coupled to one another for a rotational action, an increased friction arises at the friction cones 16.2, 14.1 and 14.2, 7 in the case of asynchronism, accelerating the synchronization process toward synchronism.

As a departure, from the embodiment of the synchronization device 1 illustrated in FIGS. 4a and 5a, the embodiment of the synchronization device 1 illustrated in FIG. 4b has different ramps, first ramps 12.1 and second ramps 12.2, which are set axially at a first angle β1 and at a second angle β2 respectively, wherein the first angle β1 is greater than the second angle β2. The axial servo force $F_R$ transferred via the first ramps 12.1 is thus greater than the axial servo force $F_R$ transferred via the second ramps 12.2, in this arrangement, the first ramps 12.1 are designed for force transfer in the case of asynchronism of the synchronizer rings 4, 13 from a higher gear to a gear associated with the change wheel 6, and the second ramps 12.2 are designed for force transfer in the case of asynchronism of the synchronizer rings 4, 13 from a lower gear to the gear associated with said change wheel 6.

Various illustrations of another embodiment of the synchronization device 1 with two synchronization devices 1 arranged as a mirror image to one another are shown in FIGS. 6 to 8, wherein the synchronization device 1 which is on the left here is designed as a triple-cone synchronizer and the synchronization device 1 which is on the right here is designed as a double synchronizer. In the triple synchronizer, the synchronizer ring 13, in contrast to that of the double synchronizer, has a rear third friction cone surface 14.2, in which the synchronizer ring 13 is supported by the second friction cone surface 7 of the change wheel 6. In the double synchronizer, the synchronizer ring 13 is supported at the front on the change wheel 6, thereby allowing significantly lower friction here in comparison with the triple synchronizer. However, this design difference is irrelevant to the production of the servo force $F_R$ since provision is made here for the two synchronizer rings 4, 13 to be coupled to one another by ramps 12 that are provided, thus ensuring that the servo force $F_R$ in the servo force direction s is produced through the interaction of the two synchronizer rings 4, 13 via the transfer units 19, of which there are three here.

By way of example, two different pairs of a projection 17 and an opening 18 are shown in FIGS. 7a and 7b, wherein the projections 17 are part of the blocking synchronizer ring 4 in FIG. 7a and part of the synchronizer ring 13 in FIG. 7.

The force ratios across the ramps 12 of mutually coupled synchronizer rings 4, 13 and the intermediate cone 15 between them are illustrated in FIG. 8, and here, in contrast to FIG. 5, the blocking synchronizer ring 4 is illustrated on the left and the synchronizer ring 13 on the right. On the right, the synchronizer ring 13 is shown separately with a projection 17 of the blocking synchronizer ring 4 engaging in the opening 18 of the synchronizer ring 13. Owing to the servo force $F_R$ arising there, the two synchronizer rings 4, 13 are pressed together more strongly, thereby increasing the friction thereof on the fourth friction cone surfaces 16.1, 16.2 of the intermediate cone 15. Since the servo force $F_R$ is produced already at the blacking synchronizer ring 4, the increased normal force N already acts on the ramps 12 here.

In a possible combination of the two embodiments of the synchronization device 1 in accordance with FIGS. 3 to 8, a combination which is not illustrated here however, the intermediate cone can be supported via the ramps on the change wheel, and, in addition, the two synchronizer rings can be supported on one another, likewise via ramps.

FIG. 8a shows another embodiment of the synchronization device 1, which, like the embodiments of the synchronization device 1 which are illustrated in FIGS. 4b and 5a, has different first ramps 12.1 and second ramps 12.2, which are set axially at the first angle β1 and second angle β2 respectively to the shaft W.

FIGS. 9 to 12 show another embodiment of the synchronization device 1, which in this case is designed as a single-cone synchronizer. This means that only one blocking synchronizer ring 4 with blocking teeth 4.1 is provided, being supported via its first friction cone surface 5 on the second friction cone surface 7.

To produce the servo force $F_R$ two further component elements 11.1 of the group 11 of component elements are provided here in the force flow region k. The second friction cone surface 7 is arranged in a discrete friction cone surface element 20, which is supported via ramps 12 on the change wheel 6 in the case of synchronization, producing the servo force $F_R$. Moreover, an energizing element 21, in this case a disk-type energizing element, with friction surfaces facing in the axial direction, a friction surface 22.1 at the front in the servo force direction s and a friction surface 22.2 at the rear in the servo force direction s, is furthermore provided as a further component element 11.1 of the group 11 of component elements.

As is clearly apparent especially in FIG. 10, an enlarged detail X of FIG. 9, the friction cone element 20 reaches around the energizing element 21 in the manner of a hook radially on the inside and rests on the front friction surface 22.1 of the energizing element 21. The energizing element 21 rests by means of its rear friction surface 22.1 on the change wheel 6. Thus, during synchronization, an additional friction arises at the friction surfaces 22.1, 22.2, essentially accelerating the synchronization process. The friction surfaces 22.1, 22.2 are arranged in a radially inner ring region 23.1, which is highlighted by means of black shading in FIG. 10. The energizing element 21 has an outer ring region 23.2, in which it is supported on the blocking synchronizer ring 4 via the ramps 12 illustrated in FIG. 12*a*. The energizing element 21 has a plurality of projections 17, which are spaced apart circumferentially in a uniform manner, extend counter to the servo force direction s, each engage in an opening 18 that is provided and, depending on the direction of a speed difference between the change wheel 6 and the synchronizer body 2, engage by means of a circumferential outer side face 17.1 as a ramp 12 on a circumferential inner side face 18.1 as a ramp 12, producing servo force $F_R$.

As FIG. 11, an enlarged detail XI of FIG. 10, shows, the friction cone element 20 likewise has a ring of projections 17 spaced apart circumferentially in a uniform manner and having ramps 12, wherein the projections 17 engage on the change wheel 6 in openings 18 that are provided and that have inner side faces 18.1 as ramps 12, and rest on the ramps 12 during synchronization. Since the energizing element 21 is coupled to the blocking synchronizer ring 4, and the friction cone element 20 is coupled to the change wheel 6, the projections 17 of the friction cone element 20 each rest by means of an outer side face 17.1 on an inner side face 18.1 of the associated opening 18 in the change wheel 6 during the synchronization process while the change wheel 6 and the first synchronizer ring 4 are not in synchronism. The inner side faces 18.1 of the openings 18 in the blocking synchronizer ring 4 and the energizing element 21 face in the servo force direction s.

As indicated in FIGS. 11, 12*a* and 12*b*, the opening 18 has a circumferential assembly tolerance w, i.e. the opening 18 is widened by the assembly tolerance relative to the circumferential extent of the associated projection 17 in order to allow problem-free assembly, i.e. fitting of the projection 17 and the opening 18 one inside the other.

Since a servo force $F_R$ is produced in two different regions, it is thus possible to achieve an increased servo force $F_R$ overall. By means of the energizing element 21 with its two friction surfaces 22.1, 22.2, an additional friction is produced in the event of asynchronism by the first synchronizer ring 4 and the change wheel 6 in addition to the friction cones 5, 7, considerably shortening the synchronization process in comparison with conventional single-cone synchronizers. The servo force $F_R$ acting on the friction cone element 20 furthermore increases the friction on the energizing element 21, and the servo force $F_R$ acting on the blocking synchronizer ring 4 increases the friction on the friction cones 5, 7. These two factors lead to a considerable acceleration of the synchronization process.

As depicted by way of example in FIG. 11, a spacing x is provided between the coupled component parts 10 or component elements 11.1, i.e. in this case between the change wheel 6 with the opening 18 and the friction cone element 20 with the projection 17, to ensure that in this case the change wheel 6 and the friction cone element 20 do not rub against relatively small surfaces on the front faces instead of over the friction cone surfaces provided, which are larger in comparison, which would furthermore reduce the possible servo force. However, it is immediately evident from the drawing that this spacing x can have some other value greater than zero. This in turn means that axial tolerances between the coupled component parts and with respect to the synchronization device can be compensated with little effort by means of a somewhat smaller or larger spacing than that shown.

As a departure from FIG. 12*a*, FIG. 12*b* shows asymmetric ramps 12.1, 12.2, which, as likewise shown in FIGS. 4*a*, 5*a* and 8*a*, are inclined axially at different angles $\beta1$, $\beta2$ to the shaft W in order to transfer different axial servo forces $F_R$.

In FIGS. 4*b*, 5*a*, 8*a* and 12*b*, the asymmetric ramps 12.1, 12.2 are configured in such a way that the first angle $\beta1$ of the first ramps 12.1 is greater than the second angle $\beta2$ of the second ramps. It is self-evident that, as described above, the first angle can be less than the second angle, especially in the case of synchronization devices for higher gears.

The invention claimed is:

1. A synchronization device for a transmission, having a sliding sleeve, a blocking synchronizer ring and a change wheel, wherein, in a force flow region between the blocking synchronizer ring and the change wheel, ramps for producing a servo force axial with respect to a shaft are provided on at least one component part, the ramps including first ramps and second ramps wherein the first ramps for servo force production when downshifting from a higher gear are arranged at a first angle to the shaft, and the second ramps for servo force production when upshifting from a lower gear are arranged at a second angle to the shaft, wherein the first angle is unequal to the second angle.

2. The synchronization device as claimed in claim 1, wherein the first angle is greater than the second angle when the change wheel in the transmission is provided for a first gear.

3. The synchronization device as claimed in claim 2, wherein the first angle is at least twice as great as the second angle.

4. The synchronization device as claimed in claim 1, wherein the first angle is less than the second angle when the change wheel in a transmission is provided for a gear higher than a first gear.

5. The synchronization device as claimed in claim 4, wherein the first angle is at least 5° less than the second angle.

6. The synchronization device as claimed in claim 1, wherein at least one component part or one group of component elements comprising at least one component element is arranged between the blocking synchronizer ring and the change wheel, wherein the component part or the component element of the group of component elements is supported in a direction of the blocking synchronizer ring or in a direction of the change wheel with a servo force action by the ramps in order to convert a circumferential force acting on said component part or component element into the servo force.

7. The synchronization device as claimed in claim 6, wherein the ramps each have a surface normal with a direction component axial with respect to the shaft and a direction component circumferential with respect to the shaft.

8. The synchronization device as claimed in claim 6, wherein the ramps are part of at least one transfer unit with two interengaging transfer elements arranged at least substantially on a radius, with an opening spaced apart radially from the shaft and having circumferential inner side faces as ramps and with a projection spaced apart radially from the shaft and having circumferential outer side faces as ramps.

9. The synchronization device as claimed in claim 8, wherein the projection of a transfer unit extends radially or axially into the opening assigned thereto to form a plug-in connection.

10. The synchronization device as claimed in claim 8, wherein the projection is a tab.

11. The synchronization device as claimed in claim 8, wherein at least two transfer units spaced apart circumferentially in a uniform manner are provided.

12. The synchronization device as claimed in claim 6, wherein a component part designed as a synchronizer ring is provided axially between the blocking synchronizer ring and the change wheel in the force flow region, and a component part designed as an intermediate cone is provided axially between the two synchronizer rings in the force flow region, wherein the synchronizer ring is supported on the blocking synchronizer ring via the ramps in order to produce the servo force, or the intermediate cone is supported on the change wheel via the ramps in order to produce the servo force.

13. The synchronization device as claimed in claim 6, wherein the blocking synchronizer ring has a first friction cone surface and the group of component elements comprises as component elements a friction cone element having a second friction cone surface and an energizing element having friction surfaces, wherein the friction cone element is supported on the change wheel via the ramps and on the first friction cone surface of the blocking synchronizer ring via the second friction cone surface, and the energizing element is supported at the front in the servo force direction on the friction cone element by means of the friction surfaces and is supported at a rear in the servo force direction on the change wheel by means of the friction surfaces.

14. The synchronization device as claimed in claim 13, wherein the energizing element is a ring-shaped disk, wherein the friction surfaces thereof are arranged perpendicularly to the shaft, and wherein the energizing element is supported on the blocking synchronizer ring via the ramps in order to produce the servo force.

* * * * *